(12) United States Patent
Paez

(10) Patent No.: US 9,845,890 B2
(45) Date of Patent: Dec. 19, 2017

(54) GATE VALVE FOR CONTROLLING THE PASSAGE OF LIQUID

(71) Applicant: VALTERRA PRODUCTS, LLC, Mission Hills, CA (US)

(72) Inventor: Ricardo Paez, San Isidro, CA (US)

(73) Assignee: Valterra Products, LLC, Mission Hills, CA (US)

( * ) Notice: Subject to any disclaimer, the term of this patent is extended or adjusted under 35 U.S.C. 154(b) by 151 days.

(21) Appl. No.: 14/992,548

(22) Filed: Jan. 11, 2016

(65) Prior Publication Data
US 2017/0198816 A1 Jul. 13, 2017

(51) Int. Cl.
F16K 3/02 (2006.01)
F16K 1/36 (2006.01)
F16K 1/42 (2006.01)

(52) U.S. Cl.
CPC .............. *F16K 3/0263* (2013.01); *F16K 1/36* (2013.01); *F16K 1/42* (2013.01); *F16K 3/0281* (2013.01)

(58) Field of Classification Search
CPC ... F16K 1/42; F16K 1/36; F16K 3/316; F16K 3/0281; F16K 3/0218; E02B 7/28; E02B 7/30; E02B 7/54
USPC .......... 251/214, 318, 319, 328, 329; 405/106
See application file for complete search history.

(56) References Cited

U.S. PATENT DOCUMENTS

| | | | |
|---|---|---|---|
| 2,771,904 A | 11/1956 | Sherman et al. | |
| 3,662,778 A * | 5/1972 | Leopold, Jr. | F16K 3/28 137/375 |
| 3,710,816 A | 1/1973 | Prince | |
| 3,726,306 A | 4/1973 | Purvis | |
| 3,844,531 A | 10/1974 | Grengs | |
| 3,945,606 A | 3/1976 | McDonald | |
| 4,201,365 A | 5/1980 | Paptzun et al. | |
| 4,231,388 A * | 11/1980 | Wallace | F16K 3/02 137/242 |
| 4,316,483 A * | 2/1982 | Jandrasi | F16K 3/314 137/315.13 |
| 4,703,915 A | 11/1987 | King | |
| 5,014,730 A | 5/1991 | Fye | |
| 5,020,776 A | 6/1991 | Owens et al. | |
| 5,295,661 A | 3/1994 | Roussel | |
| 5,427,353 A | 6/1995 | Lewis | |
| 5,979,874 A | 11/1999 | Gambetta et al. | |
| 6,375,157 B1 * | 4/2002 | Van de Lande | F16K 27/044 251/327 |
| 6,959,912 B2 | 11/2005 | Reeves et al. | |
| 7,201,361 B2 | 4/2007 | Grandage | |
| 8,534,309 B2 | 9/2013 | Metzger | |

(Continued)

FOREIGN PATENT DOCUMENTS

GB 2226103 A 6/1990

*Primary Examiner* — Matthew W Jellett
(74) *Attorney, Agent, or Firm* — Christopher L. Makay

(57) ABSTRACT

A gate valve includes a valve body having a fluid passage for the passage of liquid, sludge and/or fecal matter and a substantially flat slider. The slider is slideable between an opened and a closed position in order to open or block the fluid passage, respectively. The slider includes two opposite straight edges via which the slider is slidably guided in the valve body surrounding it. The slider is substantially made from a plastic material. The slider includes flanges along each of the two opposite straight edges for providing rigidity to the slider.

7 Claims, 3 Drawing Sheets

(56) References Cited

U.S. PATENT DOCUMENTS

| | | | |
|---|---|---|---|
| 2009/0057598 A1* | 3/2009 | Anawatkochakorn | F16K 3/12 251/329 |
| 2011/0220828 A1* | 9/2011 | Kennedy | F16K 3/0218 251/328 |
| 2013/0313462 A1 | 11/2013 | Falesnik | |
| 2015/0300507 A1* | 10/2015 | Goodwin | F16K 11/07 251/12 |
| 2015/0323084 A1* | 11/2015 | Winther | F16K 3/12 251/329 |

* cited by examiner

GATE VALVE FOR CONTROLLING THE PASSAGE OF LIQUID

BACKGROUND OF THE INVENTION

1. Field of the Invention

The present invention relates to a gate valve for controlling the passage of liquid, sludge and/or fecal matter through a fluid passage. The invention further relates to a vehicle, such as a mobile home, a trailer or a motor home, comprising the new gate valve. The invention even further relates to a slider for use in a gate valve according to the present invention.

2. Description of the Related Art

Gate valves for controlling the passage of liquid, sludge and/or fecal matter are already known in the art. A known gate valve comprises a valve body having a fluid passage for the passage of liquid, sludge and/or fecal matter, and comprises a substantially flat slider which is slideable between an opened and a closed position in order to open or block the fluid passage, respectively, wherein the slider comprises two opposite straight edges via which the slider is slidably guided in the valve body surrounding it, and wherein the slider is substantially made from a plastic material.

A drawback of the known gate valve is that the dimensions of the fluid passage, and thus also of the slider, are restricted as the slider is not sufficient rigid for relatively large fluid passages. As such, for relatively large fluid passages, there is an increased risk of the slider to flex and to destroy gate seals during sliding of the slider to the closed position.

SUMMARY OF THE INVENTION

It is an object of the present invention to provide for a gate valve comprising a more rigid slider compared to the slider of the known gate valve.

The object is achieved, in a first aspect, by a gate valve comprising a valve body having a fluid passage for the passage of liquid, sludge and/or fecal matter, and comprising a substantially flat slider which is slideable between an opened and a closed position in order to open or block the fluid passage, respectively, wherein the slider comprises two opposite straight, edges via which the slider is slidably guided in the valve body surrounding it, and wherein the slider is substantially made from a plastic material, characterized, in that the slider comprises flanges along each of the two opposite straight edges for providing rigidity to the slider.

The inventors found that it is not necessary to thicken the whole slider in order to obtain an improved rigidity. The rigidity of the slider is already improved by providing both opposite straight edges of the slider with a flange. This is advantageous as in such a case, less plastic material is required to manufacture the slider.

In accordance with the present invention, a flange is an external ridge, or rim, or a thickening provided at the edge of the slider.

The gate valve according to the present invention may be used in, for example, motor homes, trailers or mobile homes, to control drainage of waste material such as fecal.

In an embodiment, the substantially flat slider is oriented in a plane, and the flanges extend from a respective edge in a direction substantially orthogonal to the plane.

The above entails that the flanges extend from their respective edge in a single direction, i.e. a direction substantially orthogonal to the plane.

Additionally the flanges may extend from a respective edge in both directions substantially orthogonal to the plane.

This means that the end face of a cross section of the slider resembles a T-shape, wherein a flange resembles the horizontal bar of the T and wherein the slider resembles the post of the T.

Typically the height of the flange is between 2 mm-12 mm, preferably between 2 mm-5 mm, more preferably between 3 mm-4 mm. It is found that flanges having such heights provide sufficient rigidity for the slider not to flex during the sliding movement thereof between the opened position and the closed position.

In another embodiment, the valve body comprises two elongated channels, each of which arranged to cooperate with a respective flange for slidably guiding the slider in the valve body.

The advantage of this embodiment is that the flanges are not only used for providing rigidity of the slider but also function as a guiding, or alignment, tool for guiding the slider along the channels of the valve body.

As mentioned above, the valve body surrounds the slider. In order to create a channel, a rim or ridge or the like may be provided on the inner side of the valve body, wherein a flange of the slider is captured by the valve body and the rim or the ridge. The channel is then identified by the valve body and the rim or the ridge.

In a further embodiment, a cross section of the fluid passage is substantially round, wherein a diameter of the round cross section is between 90 mm-400 mm, preferably between 110 mm-315 mm.

The inventors found that the rigidity of the slider is especially of importance for larger sized sliders, i.e. sliders suitable for fluid passages having a diameter larger than 90 mm.

In another embodiment, the gate valve comprises a shaft fixedly connected to the slider for operating the slider between the opened and the closed position.

In accordance with the present invention, the shaft may comprise any type of material but is preferably made of a metal.

The shaft may be operated manually using a handle provided on a free end of the shaft. The slider is moved, i.e. slided, to the closed position by pushing the handle towards the valve body. Similarly, the slider is mover, i.e. slided, to the opened position by pulling the handle away from the valve body.

In addition to the above, the shaft may be molded into the slider, such that it is not possible to remove the shaft from the slider without breaking the slider or the shaft.

The above may be accomplished by providing the shaft with a thickened end, wherein the molded part of the slider is such that it encompasses the thickened end of the shaft.

In a second aspect, there is provided a vehicle, such as a motor home or a trailer, comprising a waste tank and a gate valve according to any of the previous claims for controlling the drainage of waste in the waste tank.

In a third aspect, there is provided a slider for use in a gate valve according to any of the embodiments as provided above, the slider being substantially flat and slideable, in the gate valve, between an opened and a closed position in order to open or block the fluid passage, respectively, wherein the slider comprises two opposite straight, edges via which the slider is slidably guided in the valve body, wherein the slider is substantially made from a plastic material. The slider is characterized in that it comprises flanges along each of the two opposite straight edges for providing rigidity to the slider.

The above-mentioned and other features and advantages of the invention will be best understood from the following description referring to the attached drawings. In the drawings, like reference numerals denote identical parts or parts performing an identical or comparable function or operation.

The invention is not limited to the particular example disclosed below in connection with a particular type of gate valve

DETAILED DESCRIPTION OF THE PREFERRED EMBODIMENT

Figure 1:
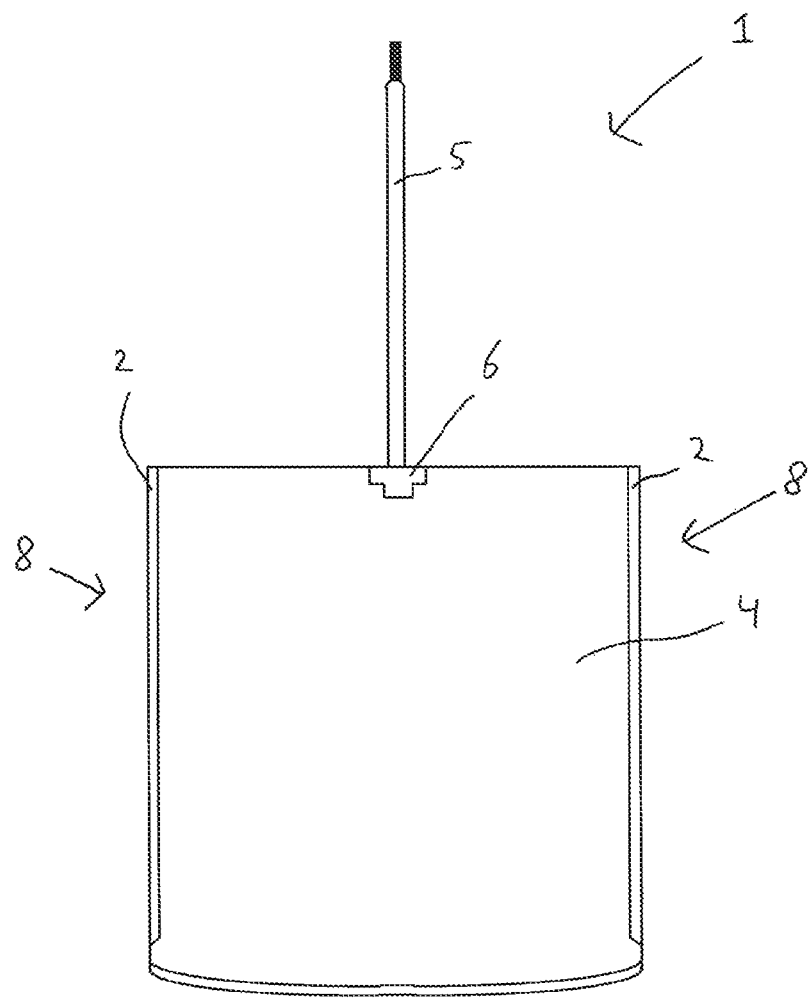
FIG. 1 shows an example of a side view of a substantially flat slider for use in a gate valve according to the present invention.

FIG. 1 is an example of a side view of a substantially flat slider 1 for use in a gate valve according to the present invention.

Figure 4:
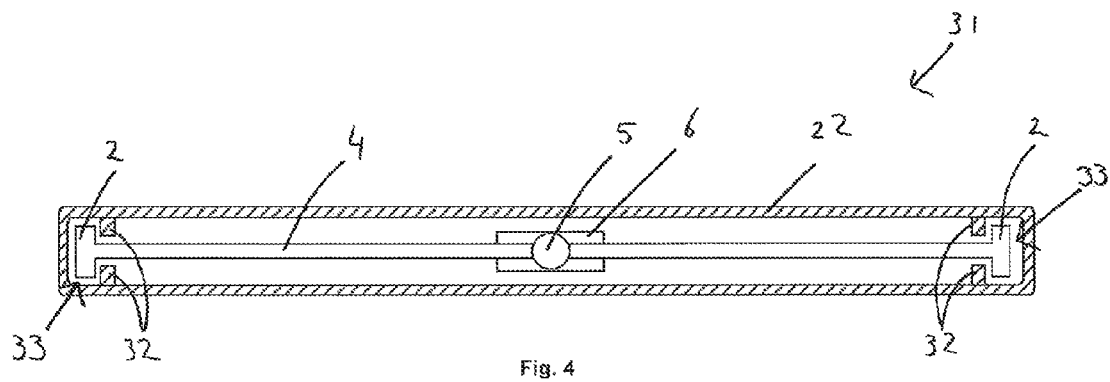
FIG. 4 shows a cross section of the gate valve shown in FIGS. 3a and 3d.

The substantially flat slider 1 is slideable between an opened and a closed position in order to open or block the fluid passage of a fluid passage of a valve body, respectively. The slider 1 comprises two opposite straight edges 8 via which the slider is slidably guided in the valve body surrounding it, which is shown in FIG. 4.

The slider 1 is slideable in the valve body in the direction indicated with reference numeral 7, wherein the end face 3 of the slider 1 is the first part of the slider entering the valve body.

According to the present invention, the slider 1 is substantially made of a plastic material 4, like thermoplastic polymers such as Polyvinylchloride, PVC, or the like. As alternatives, polyetheen, PE, popypropylene, PP, or polyethylene terefthalaat, PET, can be used. The advantage of these plastic materials is that they are cost effective and robust.

It was one of the insights of the inventors that the above described slider 1 can only be used for gate valves having relatively small dimensions. That is, the fluid passage of the gate valve, and thus also the size of the slider 1, are restricted as such a plastic slider 1, 4 is not sufficient rigid for relatively large fluid passages. As such, for relatively large fluid passages, there is an increased risk of the slider 1 to flex and to destroy gate seals during sliding of the slider between the opened position and the closed position.

The inventor has found a solution to the above described drawback in that the slider 1 comprises flanges 2 along each of the two opposite straight edges 8 for providing rigidity to the slider 1.

Figure 2:
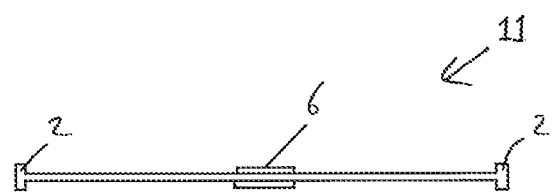
FIG. 2 shows an example of a cross section of the substantially at slider shown in FIG. 1.

It is preferred that the flanges 2 extend from a respective edge in both directions substantially orthogonal to the slider 1 itself. This aspect is shown in the cross section 11 shown in FIG. 2, wherein the flanges 2 extend upwardly as well as downwardly from the slider 1. The height of such flanges 2, i.e. the length of its extension, is preferably between 3 mm-4 mm as this provides sufficient rigidity to the slider 1 itself.

FIG. 1 further shows a shaft 5 fixedly connected to the slider 1 for operating the slider 1 between the opened and closed position. The shaft 5 may be operated manually or using any form of hydraulic or pneumatic means. The shaft 5, for example a metal shaft, may be molded into the slider 1 In order to provide for a firm connection. Of course, a skilled person in the art should be aware of suitable plastic material for providing such a molded connection 6.

Figures 3A, 3B:
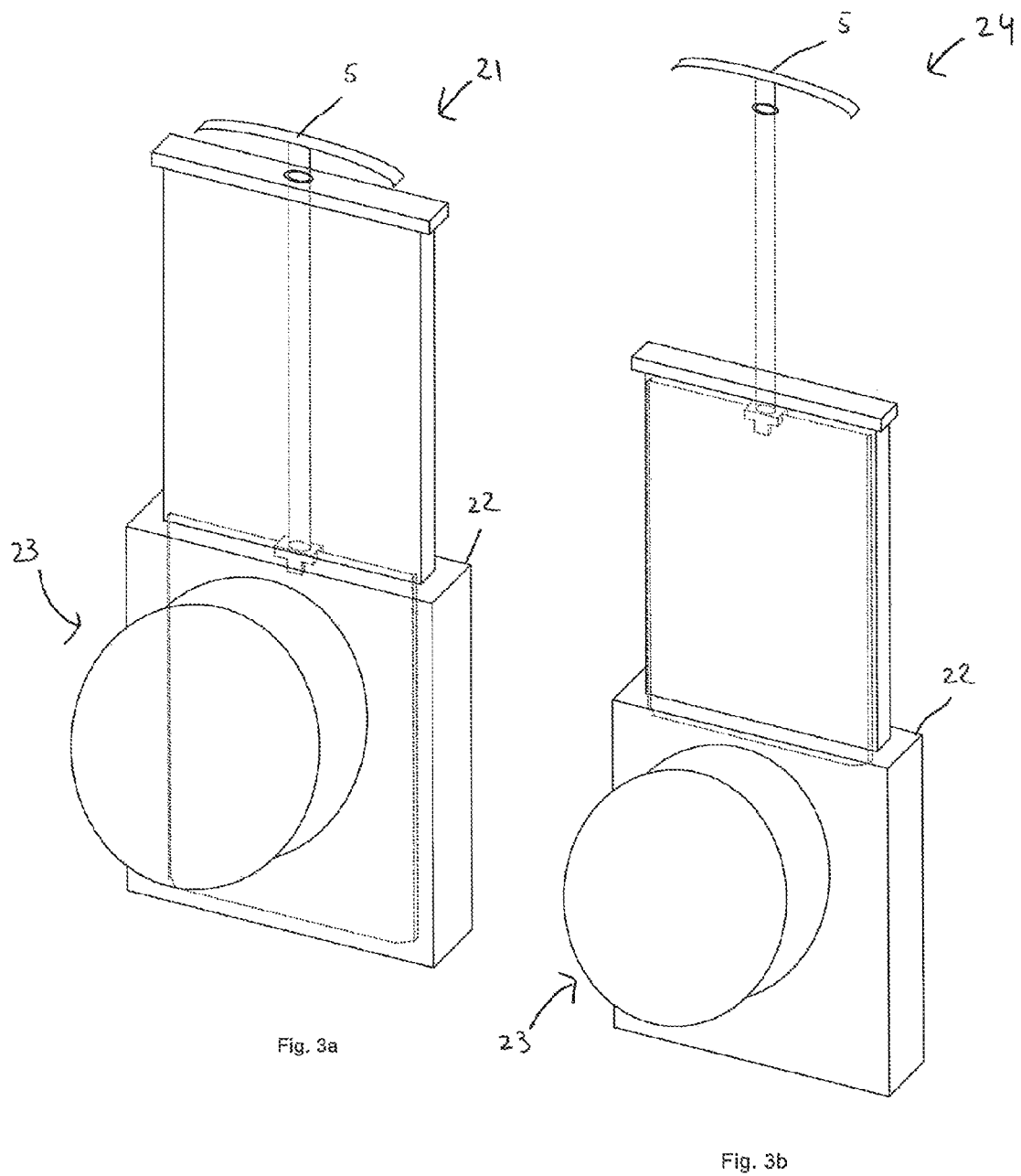
FIG. 3a shows an example of a gate valve according to the present invention, wherein the slider has been slided to the closed position in order to block the fluid passage.
FIG. 3b shows an example of a gate valve according to the present invention, wherein the slider has been slided to the opened position in order to open the fluid passage.

FIG. 3a shows an example of a gate valve 21 according to the present invention. The gate valve 21 comprises a valve body 22 having a fluid passage 23 for the passage of liquid, sludge and/or fecal matter. The gate valve 21 comprises a substantially flat slider which is slideable between an opened and a closed position in order to open or block the fluid passage, respectively. As such, the slider 1 according to FIG. 1 is used within the valve body for doing so. In the present example, the fluid passage is blocked, i.e. closed, as the handle 5 of the slider 1 is in its downward direction.

FIG. 3b shows the same gate valve 21 as depicted in FIG. 3a. In this case, however, the substantially flat slider has been slided to the opened position such that the fluid passage 23 is opened.

As mentioned before, typically, the drawback of the invention is at issue for relatively large sized fluid passages, i.e. wherein the diameter of a round cross section of the passage is between 90 mm-400 mm, preferably between 110 mm-315 mm.

FIG. 4 shows a cross section 31 of the gate valve shown in FIGS. 3a and 3d. Here, it is shown that the slider 4 is slidably guided in the valve body 22 surrounding it. The valve body comprises two elongated channels 33 along the sliding direction 7 of the slider 1, in order to guide the slider 1 in the valve body 22. These two channels 33 comprise protrusions 32 or the like, to substantially encompass the flanges 2 of the slider 1. Each of the flanges 2 is then thus substantially enclosed by its respective protrusion 32 of one of the channels 33.

In the present situation, the channels 33 are thus formed by the valve body 22 and the protrusions 32, respectively. Such channels 33 ensure that the slider is correctly guided along the valve body 22.

Figure 5A:
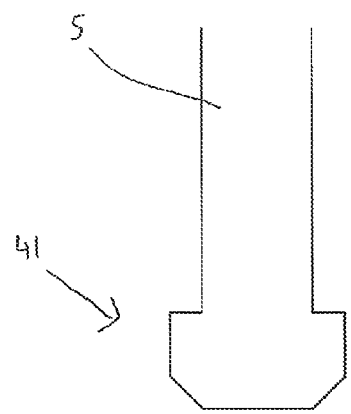
FIG. 5a shows a free end of the shaft, which free end is to be molded into the slider.
Figure 5B:
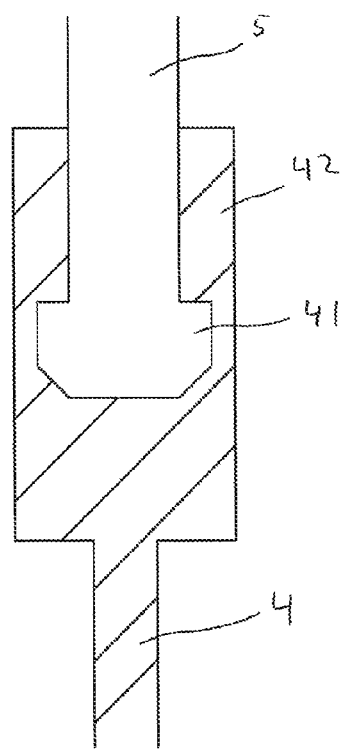
FIG. 5b shows the shaft molded into the slider.

FIG. 5a shows a free end of the shaft 5, which free end is to be molded into the slider. The free end of the shaft 5 comprises a thickened end 41 which is used to securely connect the shaft 5 to the slider. This is depicted in FIG. 5b, which shows the shaft 5 molded into the slider. Here, the thickened end 41 is encompassed by the slider 4 via its molding part 42.

According to the present invention, the gate valve may be used for any vehicle, like a motor home or a trailer, wherein the vehicle comprises a waste tank and the gate valve according to any of the previous embodiments for controlling drainage of waste in the waste tank.

It will be clear to those skilled in the art, that the invention is described above by means of several embodiments. However, the invention is not limited to these embodiments. The desired protection is defined by the appended claims.

The invention claimed is:
1. A gate valve, comprising:
a valve body defining a fluid passage for the passage of liquid, sludge, and/or fecal matter, the valve body, including:
first opposed protrusions located interior to the valve body at a first end of the valve body, wherein the first opposed protrusions define a first elongated channel at the first end of the valve body, and second opposed protrusions located interior to the valve body at a second end of the valve body, wherein the second opposed protrusions define a second elongated channel at the second end of the valve body; and a slider which is slideable between an opened position that opens the fluid passage and a closed position that blocks the fluid passage and facilitates a sealing of the gate valve, wherein:

the slider comprises a first straight edge opposite a second straight edge via which the slider is slidably guided in the valve body surrounding it, the slider is substantially made from a plastic material, and the slider comprises:

a first flange substantially orthogonal to and along the first straight edge for providing rigidity to the slider, wherein the first flange inserts into the first elongated channel such that the first opposed protrusions substantially encompass the first flange, further wherein the first elongated channel cooperates with the first flange for slideably guiding the slider in the valve body and for reducing slider flex thereby improving the sealing of the gate valve, and a second flange substantially orthogonal to and along the second straight edge for providing rigidity to the slider, wherein the second flange inserts into the second elongated channel such that the second opposed protrusions substantially encompass the second flange, further wherein the second elongated channel cooperates with the second flange for slideably guiding the slider in the valve body and for reducing slider flex thereby improving the sealing of the gate valve.

2. The gate valve according to claim 1, wherein the slider is oriented in a plane, and the flanges extend from a respective edge in a direction substantially orthogonal to the plane.

3. The gate valve according to claim 2, wherein the flanges extend from a respective edge in both directions substantially orthogonal to the plane.

4. The gate valve according to claim 3, wherein a height of the flanges is between 2 mm-5 mm.

5. The gate valve according to claim 1, wherein a cross section of the fluid passage is substantially round, further wherein a diameter of the round cross section is between 90 mm-400 mm.

6. The gate valve according to claim 1, wherein the gate valve comprises a shaft fixedly connected to the slider for operating the slider between the opened and the closed position.

7. The gate valve according to claim 6, wherein the shaft is molded into the slider.

\* \* \* \* \*